United States Patent
Qian et al.

(10) Patent No.: US 6,697,506 B1
(45) Date of Patent: Feb. 24, 2004

(54) MARK-FREE COMPUTER-ASSISTED DIAGNOSIS METHOD AND SYSTEM FOR ASSISTING DIAGNOSIS OF ABNORMALITIES IN DIGITAL MEDICAL IMAGES USING DIAGNOSIS BASED IMAGE ENHANCEMENT

(75) Inventors: Jianzhong Qian, Monmouth Junction, NJ (US); Sreerama K. V. Murthy, New Delhi (IN); Carol L. Novak, Newton, PA (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 09/271,471

(22) Filed: Mar. 17, 1999

(51) Int. Cl.[7] .................................................. G06K 9/00
(52) U.S. Cl. ....................... 382/128; 382/260; 600/410; 600/427
(58) Field of Search .................. 382/128, 131, 382/132, 130, 129, 139, 133, 260, 261, 262, 263, 264, 265; 378/37, 97; 600/407, 310, 322, 458, 443, 300, 410, 411, 427

(56) References Cited

U.S. PATENT DOCUMENTS

| | | | |
|---|---|---|---|
| 4,907,156 A | * 3/1990 | Doi et al. ................... 382/130 |
| 5,432,865 A | * 7/1995 | Kasdan et al. .............. 382/128 |
| 5,459,536 A | * 10/1995 | Shlon et al. ................ 351/226 |
| 5,491,627 A | 2/1996 | Zhang et al. ............ 364/413.2 |
| 5,579,360 A | * 11/1996 | Abdel-Mottaleb ........... 378/37 |
| 5,699,082 A | * 12/1997 | Marks et al. ............... 345/157 |
| 5,768,406 A | 6/1998 | Abdel-Mottaleb .......... 382/132 |
| 5,815,591 A | 9/1998 | Roehrig et al. ............. 382/128 |
| 5,838,815 A | 11/1998 | Gur et al. ................... 382/128 |
| 5,933,540 A | * 8/1999 | Lakshminarayanan et al. .......................... 382/260 |
| 5,970,115 A | * 10/1999 | Colbeth et al. ............... 378/62 |
| 5,970,164 A | * 10/1999 | Bamberger et al. ......... 382/128 |
| 6,075,878 A | * 6/2000 | Yoshida et al. ............. 382/132 |

\* cited by examiner

Primary Examiner—Jayanti K. Patel
Assistant Examiner—Abolfazl Tabatabai
(74) Attorney, Agent, or Firm—Donald B. Paschburg; F. Chau & Associates LLP

(57) ABSTRACT

A mark-free computer-assisted diagnosis method and system are provided for assisting diagnosis of abnormalities in digital medical images using diagnosis based image enhancement. The method includes the steps of: receiving indicia identifying one or more regions of interest in a digital medical image; and displaying one or more enhanced views of the regions of interest, the enhanced views being based on diagnostic parameters for the regions of interest and diagnostic parameters corresponding to a particular abnormality.

32 Claims, 3 Drawing Sheets

MARK-FREE COMPUTER-ASSISTED DIAGNOSIS METHOD AND SYSTEM FOR ASSISTING DIAGNOSIS OF ABNORMALITIES IN DIGITAL MEDICAL IMAGES USING DIAGNOSIS BASED IMAGE ENHANCEMENT

BACKGROUND

1. Technical Field

The present invention relates generally to computer-assisted diagnosis (CAD) and, in particular, to a mark-free CAD method and system for assisting diagnosis of abnormalities in digital medical images using diagnosis based image enhancement.

2. Background Description

Computer-assisted diagnosis is an important technology in many different clinical applications. However, one of the more prevalent clinical applications for computer-assisted diagnosis is in the detection of breast cancer in women. According to the American Cancer Society, breast cancer is the most common cancer among women, other than skin cancer. It is the leading cause of death among women aged 40 to 55. There are approximately 179,000 new cases of breast cancer in the United States each year and about 43,500 deaths from the disease.

While there are presently no means for preventing breast cancer, early detection of the disease prolongs life expectancy and decreases the likelihood of the need for a total mastectomy. Accordingly, the American Cancer Society recommends that all women aged 40 and older should have a mammogram every year.

A typical mammogram is performed using x-rays and may contain a lot of background structures corresponding to breast tissue. Accordingly, a trained, focused eye of a radiologist is needed to detect small lesions among these structures. However, a typical radiologist may be required to examine hundreds of mammograms on a daily basis, leading to the possibility of a missed diagnosis due to human error.

To assist in the detection of abnormal lesions in x-ray mammograms, computer-assisted diagnosis (CAD) systems have been developed. The CAD systems digitize x-ray mammograms to produce a digital mammogram, and perform image processing on the digital mammogram. The output of such CAD systems is a highlighted or "marked" display, the marks directing the attention of the radiologist to suspicious regions in the mammogram.

Examples of prior art systems will now be given. U.S. Pat. No. 5,815,591, entitled "Method and Apparatus for Fast Detection of Spiculated Lesions in Digital Mammograms", issued on Sep. 29, 1998, and incorporated by reference herein, describes a technique to identify a specific type of abnormality in x-ray mammograms, namely spiculated masses. Such masses are indicated by line structures emanating from a location in the breast in different directions. Identification is made by inferring the shape and type of the mass from the line structures and their intersections.

U.S. Pat. No. 5,491,627, entitled "Method and System for the Detection of Microcalcifications in Digital Mammograms", issued on Feb. 13, 1996, and incorporated by reference herein, describes a technique for detecting a specific type of abnormality in mammograms, namely, microcalcifications.

U.S. Pat. No. 4,907,156, entitled "Method and System for Enhancement and Detection of Abnormal Anatomic Regions in a Digital Image", issued on Mar. 6, 1990, and incorporated by reference herein, describes a technique for global enhancement and detection of lung nodules and mammographic lesions. Enhancement is done by subtracting two processed versions of the x-ray image from each other. In one processed version the signal-to-noise ratio is increased, and in the other processed version the signal-to-noise ratio is suppressed. The detection is performed on the subtracted image, which has fewer low frequency background structures.

U.S. Pat. No. 5,579,360, entitled "Mass Detection by Computer Using Digital Mammograms of the Same breast Taken from Different Viewing Directions", issued on Nov. 26, 1996, and incorporated by reference herein, describes a method for detecting a specific type of abnormality, namely, masses, by comparing two views of the same breast. Each view is analyzed individually to detect suspicious regions. False positives are reduced via comparisons of the characteristics of the lesions in both views. The remaining lesions are either marked or generically enhanced.

U.S. Pat. No. 5,768,406, entitled "Mass Detection in Digital X-Ray images Using Multiple Threshold Levels to Discriminate Spots", issued on Jun. 16, 1998, and incorporated by reference herein, describes a technique for detecting masses from single mammographs. Detected lesions are either marked or generically enhanced.

U.S. Pat. No. 5,838,815, entitled "Method and System to Enhance Robust Identification of Abnormal Regions in Radiographs", issued on Nov. 17, 1998; describes a technique of applying multiple global detection schemes for the same abnormality on multiple probabilistic variations of a radiograph. Detection of abnormalities using the technique is claimed to be made more robust. No image enhancement is disclosed.

However, such CAD systems are not without deficiency. For example, lesions such as cancers are sometimes missed on the softcopy reading in part because the optical density and contrast of the cancerous area in the image is not optimal for human detection. It is very difficult to optimize the display of the entire image with a single set of display parameters, since image characteristics (e.g., contrast) vary over the different parts of the image. It is also difficult to optimize the display for different types of lesions by using a single set of display parameters.

Moreover, with respect to the systems which provide a "marked output", some physicians would likely feel more comfortable with a diagnosis when they are in control of the entire diagnostic process (i.e., when marks are not provided). Further, the marks may be distracting for some physicians who do not rely on the marks in making a diagnosis. On the other hand, the marks may limit the physicians' review of other areas of the softcopy which may contain an "unmarked" but nonetheless abnormal region.

Further, such systems suffer from the problem of false positives, that is, the marking of normal regions. False positives result in time lost by the radiologist, increased healthcare costs, trauma to the patient, and lack of trust in computer-assisted diagnosis.

Thus, it would be desirable and highly advantageous to have a CAD method and system that uses different sets of display parameters for different lesions in different local areas of the image. Moreover, it would be desirable and highly advantageous to have a CAD method and system that does not introduce marks onto the soft-copy which may be distracting to the physician or may result in other adverse affects (such as limiting the physician's review of other areas of the image).

SUMMARY OF THE INVENTION

The present invention is directed to a mark-free computer-assisted diagnosis method and system for assisting diagnosis of abnormalities in digital medical images using diagnosis based image enhancement. The invention integrates a physician's knowledge into the computer-assisted diagnosis process seamlessly, performs diagnostic computation accordingly, and then uses different sets of display parameters for different lesions at different parts of the image.

In one aspect of the present invention, a computer-assisted method for assisting diagnosis of abnormalities in digital medical images comprises the steps of: receiving indicia identifying one or more regions of interest in a digital medical image; and displaying one or more enhanced views of the regions of interest, the enhanced views being based on diagnostic parameters for the regions of interest and diagnostic parameters corresponding to a particular abnormality.

In another aspect of the present invention, a computer-assisted diagnosis system for assisting diagnosis of abnormalities in digital medical images comprises: a memory unit; a plurality of enhancement filters stored in the memory unit, each of the plurality of filters being pre-optimized for a specific type of abnormality and adaptable for further optimization based on diagnostic parameters of a selected region in the digital medical image; a processor operatively coupled to the memory unit for performing calculations with respect to the diagnostic parameters of the selected region and diagnostic parameters associated with a plurality of abnormalities to identify and adapt one or more of the plurality of enhancement filters for displaying the selected region; and a display device operatively coupled to the processor for displaying one or more enhanced views of the selected region, the one or more enhanced views corresponding to the one or more of the plurality of enhancement filters being applied to the selected region.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to a mark-free computer-assisted diagnosis method and system for assisting diagnosis of abnormalities in digital medical images using diagnosis based image enhancement. To facilitate a clear understanding of the present invention, illustrative examples are provided herein which describe the invention in applications directed to the detection of breast cancer (i.e., assisting diagnosis in digital mammograms). However, the invention is not solely limited to applications including digital mammograms. It is to be appreciated that the invention may be used to assist diagnosis of any abnormality in any part of the body which is represented in a digital medical image.

A general description of the present invention will now given to introduce the reader to the concepts and advantages of the invention. Subsequently, more detailed descriptions of various aspects of the invention will be provided.

In general, suspicious abnormalities in a digital medical image are displayed to the user through enhancement filters which are chosen according to the specific type of abnormality provided by the diagnosis computation of the system (e.g., masses or microcalcifications) and the particular region under observation. By optimizing each filter for both the particular region under observation and each abnormality likely to be found, the user is provided with an image specifically tailored for aiding human detection of abnormalities.

Unlike conventional CAD systems, the present invention does not automatically "mark" (identify) suspicious regions in a digital medical image. Rather, the user is allowed to perform such identification without prompting, thereby affording the user total control over the diagnostic process.

Figure 1:
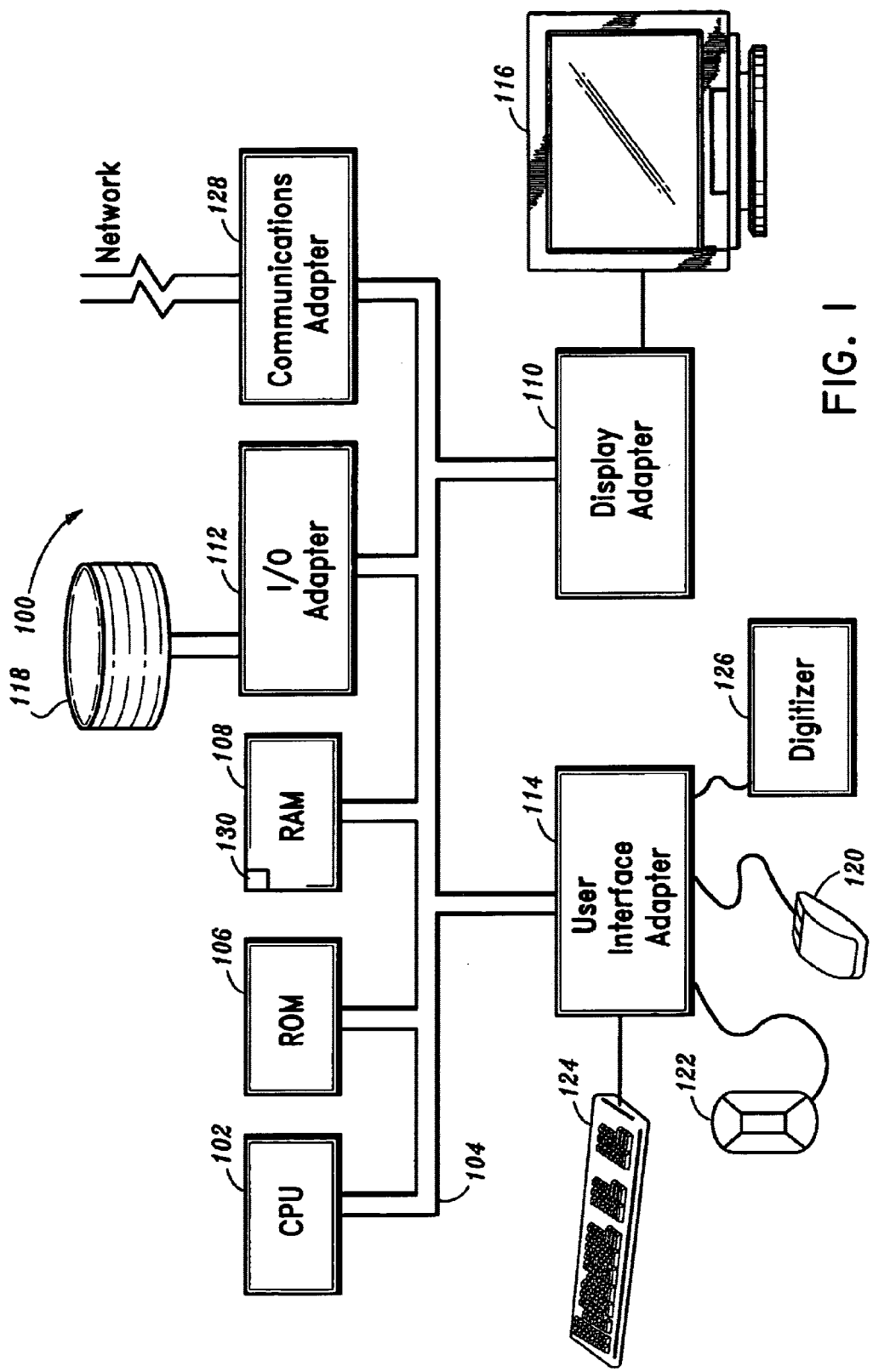
FIG. 1 is a block diagram of a computer-assisted diagnosis (CAD) system for assisting diagnosis of abnormalities in digital medical images according to an embodiment of the present invention.

FIG. 1 is a block diagram of a computer-assisted diagnosis (CAD) system for assisting diagnosis of abnormalities in digital medical images according to an embodiment of the present invention. The CAD system 100 includes at least one processor (CPU) 102 operatively coupled to other components via a system bus 104. A read only memory (ROM) 106, a random access memory (RAM) 108, a display adapter 110, an I/O adapter 112, and a user interface adapter 114 are operatively coupled to system bus 104.

A display device 116 is operatively coupled to system bus 104 by display adapter 110. A disk storage device (e.g., a magnetic or optical disk storage device) 118 is operatively couple to system bus 104 by I/O adapter 112.

A mouse 120 and eye tracking device 122 are operatively coupled to system bus 104 by user interface adapter 114. The mouse 120 and eye tracking device 122 are used to aid in the selection of suspicious regions in a digital medical image. A keyboard 124 may also be operatively coupled to system bus 104 by user interface adapter 114. The keyboard may be used to input and output information to and from CAD system 100.

The CAD system 100 may also include a digitizer 126 operatively coupled to system bus 104 by user interface adapter 114 for digitizing a developed x-ray mammogram. Alternatively, digitizer 126 may be omitted, in which case a digital mammogram may be input to CAD system 100 from a network via a communications adapter 128 operatively coupled to system bus 104.

The CAD system 100 also includes filter modules 130 which are software modules that may be stored in any of the above memories. There are at least three types of filter modules: standard filter modules; generic enhancement filter modules; and expert enhancement filter modules.

Application of a standard filter module to a digital medical image results in a standard image corresponding to the original information of the digital image. Application of a generic enhancement filter module to a digital medical image results in a generically enhanced image corresponding to generic enhancements (e.g, magnification, contrast-equalization, pixel inversion, edge sharpening/smoothing).

On the other hand, application of an expert enhancement filter module to a digital medical image results in an image referred to herein as an expert-image. An expert enhancement filter module is a filter which is pre-optimized for a specific type of abnormality and adaptable for further optimization based on characteristics of a region under observation. It is to be appreciated that while there may be more than one expert enhancement filter module per abnormality, all expert enhancement filter modules are nonetheless associated with a specific abnormality.

The filter modules may be stored in any arrangement in the above memories. For example, they may be initially stored in disk storage device 118 and then moved to RAM 108 upon startup of the system. Alternatively, a cache (not shown) may be employed to store those enhancement filter modules which are most frequently used.

The at least one processor 102 performs calculations with respect to binary data associated with the digital medical image and diagnostic parameters associated with a plurality of abnormalities to identify and adapt at least one enhancement filter for displaying a region of interest.

Figure 2:
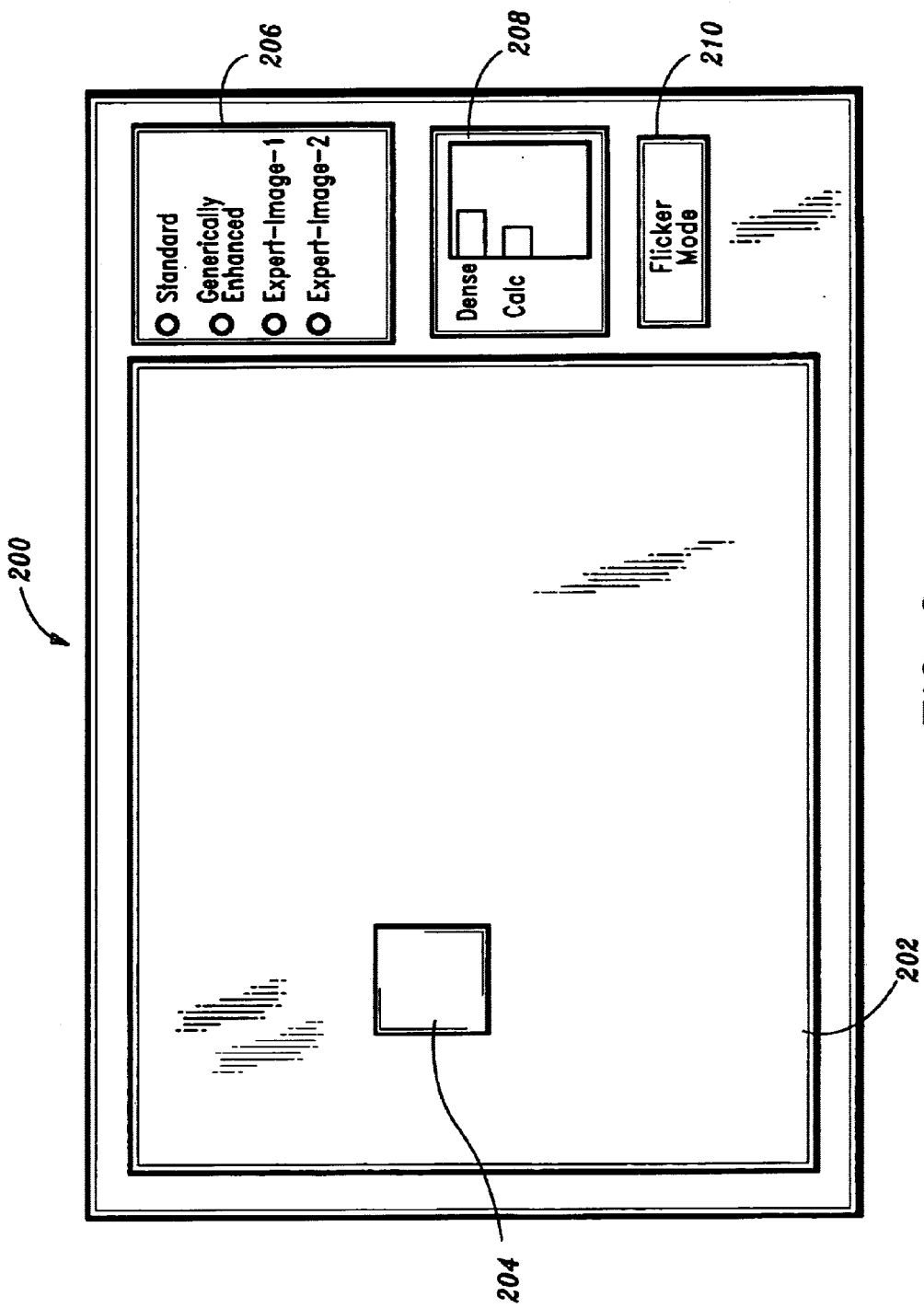
FIG. 2 is a diagram of a graphical user interface (GUI) for a CAD system according to an embodiment of the present invention.

FIG. 2 is a diagram of a graphical user interface (GUI) for a CAD system according to an embodiment of the present invention. In particular, the GUI is adaptable for display on the CAD system of FIG. 1. The GUI 200 includes: a main viewing region 202 for viewing all or part of a complete image; a focus of attention 204 for viewing a specific region of the image displayed in main viewing region 202; a filter selection box 206 for selecting a particular type of filter to apply to the image (or a portion thereof); a diagnostic parameters (DPs) display box 208 for displaying diagnostic parameters as described hereinbelow; and a flicker mode actuator 210 for activating/deactivating a flicker mode as described hereinbelow. The focus of attention 204 may be considered a virtual magnifying glass. Alternatively, focus of attention 204 may be unmagnified. In any event, focus of attention 204 is used to identify an area of interest.

In the embodiment, three different types of filters are used resulting in the following three types of images: a standard image corresponding to the original image information; a generically enhanced image corresponding to generic enhancements (e.g., magnification, contrast-equalization, pixel inversion, edge sharpening/smoothing); and an expert-image-1 to expert-image-N corresponding to each specific abnormality. Thus, in a Mammographic application, there can be, for example, an expert-image-1 for masses, an expert-image-2 for microcalcifications, and so forth. Each of the expert-images is designed and optimized according to one specific type of abnormality. Further, for each specific region, only one expert-image is ON at any given time. However, it is to be appreciated that more than one expert-image may be ON at any given time at different locations. This may be done, for example, when a visual comparison between two or more abnormalities is desired.

Moreover, it is to be further appreciated that groups of expert-images may be designed and optimized for one specific type of abnormality. Groups of expert-images for one type of abnormality may be desirable to cover the range of differences in perception and preferences from one person's eye to another.

Figure 3:
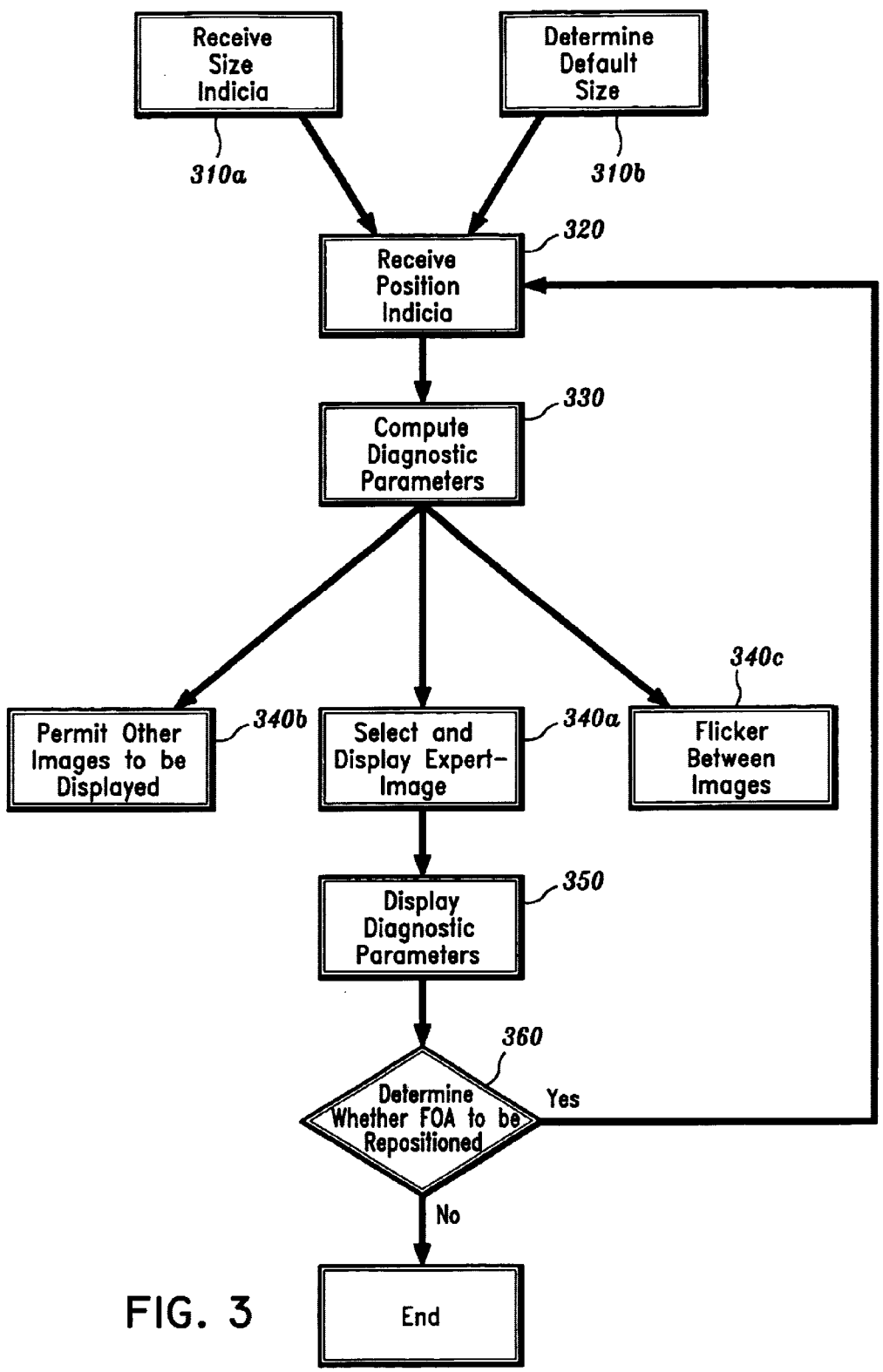
FIG. 3 is a flow chart of a computer-assisted diagnosis method for assisting diagnosis of abnormalities in digital medical images according to an illustrative embodiment of the present invention.

FIG. 3 is a flow chart of a computer-assisted diagnosis method for assisting diagnosis of abnormalities in digital medical images according to an illustrative embodiment of the present invention. Indicia indicating a size of a adaptively adjustable "focus of attention" (FOA) in the digital medical image is received from a user (step 310a). Alternatively, a default size of the focus of attention may be determined by processor 102 based on abnormalities that are likely to be present in an area of a human body represented by the digital medical image (step 310b). For example, in the female breast, some of the abnormalities which may be encountered include microcalcifications and masses.

Next, indicia indicating positioning of the focus of attention in the digital medical image is received (step 320). The positioning indicia may be provided by the user via mouse 112, eye tracking device 114, and/or keys (e.g., arrow keys) of keyboard 124. The advantage of this approach is that the physician's preferences and diagnostic knowledge are incorporated into the first and second steps of the method.

After a standard image is displayed of the region corresponding to the FOA, a set of local Diagnostic Parameters (DPs) is computed within the area defined by the FOA (step 330). Using these local diagnostic parameters (as well as diagnostic parameters associated with abnormalities likely to be found in the region of the human body represented by the digital medical image), an optimal expert-image is automatically selected (step 340a). This automatic selection is based on a best 'educated guess' which is taken according to the evidence collected from the diagnostic parameters. It is to be noted that the diagnostic parameters may be used to identify "alternate" expert-images. Accordingly, the user is also permitted to select another (i.e., alternate) expert-image according to his or her preference (step 340b). Thus, for example, if more than one expert-image is designed and optimized for a specific abnormality, then the user may cycle through some or all of the expert-images for that specific abnormality until the expert-image providing the best view is found. Alternatively, the user may select an expert-image designed and optimized for an abnormality which is different than the abnormality corresponding to the expert-image that was automatically selected. It is to be noted that the standard image may be made always available for viewing. Further, such an option may be extended to the generically enhanced image.

Optionally, the set of local Diagnostic Parameters (DPs) computed at step 330 can be displayed in a small window in the corner of the screen (for example, in the diagnostic parameters display box 208 of the graphical user interface 200 shown in FIG. 2) (step 350). Since DPs are calculated locally, they may be displayed in 'real-time' in the form of a bar graph. However, other display formats may also be used.

The DPs can be displayed (at step 350) at three different levels. At the first or top-level, each bar indicates a normalized confidence value for each of the expert-images. At the second or middle-level, each bar indicates a specific DP that physicians use most frequently in their daily clinical practice. At the third or low-level, each bar indicates a feature value from the computer vision or medical physics point of view. In most cases, the top-level visualization will be enough. But the other two levels facilitate the 'openness' or 'transparency' of the decision making process, in contrast to the 'black-box' approach of conventional CAD systems. It is to be appreciated that the invention is not limited to displaying the DPs at only three levels and, thus, more or less than three levels may be displayed.

At the medium or low level, different diagnostic parameters can be selected.

For example, the Breast Imaging Reporting and Data System (BI-RADS) lexicon from the American College of Radiology provides a set of possible medium level features. For the low level, intensity or gradient based features may be used. It is to be appreciated that the above features are illustrative and, thus, other types of features may be used in accordance with the present invention.

The features may be combined into the high level confidences using different evidence fusion algorithms. Some prior art methods for combining the multiple sources of evidence include supervised learning techniques like decision trees, artificial neural networks, or probabilistic methods.

A 'flicker' display mode may also be used to automatically switch from one expert-image to another expert-image. Preferably, this is available to the user at the time the optimal expert-image is automatically selected for the user (step 340a) and the user is permitted to select another expert-image according to his or her preference (step 340b). Thus flickering is shown as step 340c in the method of FIG. 3.

Flickering can be of use in the diagnostic decision-making process by allowing the comparison of different enhancement results. The flicker display mode may also be used to automatically switch from an expert-image to a non-expert-image (e.g., standard image or generically enhanced image).

The switching (or flickering) frequency may be made adjustable according to the physician's preference (step 340c). Flickering can be local (i.e., corresponding to the focus of attention) or global (i.e., the entire image).

It is to be appreciated that the invention provides a 'real-time' aid to the physician in that as the focus of attention of the invention moves from region to region, the results will be immediately displayed on the screen.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A computer-assisted diagnosis method for assisting diagnosis of abnormalities in digital medical images, comprising the steps of:

receiving indicia identifying at least one region of interest in a digital medical image;

automatically selecting at least one enhancement filter from among a plurality of filters based upon diagnostic parameters for the region of interest and diagnostic parameters corresponding to a particular abnormality likely to be found in the region of interest; and displaying at least one enhanced view of the region of interest by applying the at least one enhancement filter to the region of interest.

2. The method according to claim 1, wherein said method further comprises the steps of:

receiving indicia indicating a size of a viewing region in the digital medical image; and receiving indicia indicating positioning of the viewing region in the digital medical image.

3. The method according to claim 2, wherein said positioning indicia is provided from a user through one of a mouse and an eye tracking device.

4. The method according to claim 1, wherein said method further comprises the step of determining a default size of viewing region in the digital medical image based on abnormalities that are likely to be present in an area of a human body represented by the digital medical image, and said receiving step comprises the step of receiving indicia indicating positioning of the viewing region in the digital medical image.

5. The method according to claim 1, further comprising the step of displaying an unaltered view of the digital medical image.

6. The method according to claim 1, further comprising the step of displaying at least one generically enhanced view of the digital medical image.

7. The method according to claim 6, wherein the at least one generically enhanced view corresponds to at least one of magnification, contrast-equalization, pixel inversion, edge sharpening, and edge smoothing.

8. The method according to claim 1, further comprising the step of switching from the at least one enhanced view of the selected region of the digital medical image to another view of the selected region of the digital medical image.

9. The method according to claim 8, wherein said switching step is performed on a periodic basis defined by a user.

10. The method according to claim 9, wherein the generically enhanced view corresponds to at least one of magnification, contrast-equalization, pixel inversion, edge sharpening, and edge smoothing.

11. The method according to claim 8, wherein said switching step is initiated by a user.

12. The method according to claim 8, wherein the other view comprises at least one of an unaltered view, a generically enhanced view, and an alternate enhanced view.

13. The method according to claim 1, wherein the digital medical image corresponds to an x-ray mammogram and the at least one enhanced view corresponds to one of masses, architectural distortions, skinline, ducts, thickened skin.

14. The method according to claim 1, further comprising the step of displaying the diagnostic parameters for the selected region.

15. The method according to claim 1, further comprising the step of displaying the diagnostic parameters corresponding to the particular abnormality.

16. The method according to claim 1, wherein said displaying step comprises the step of applying a enhancement filter to the selected region of the digital medical image based on a local diagnostic content of the selected region.

17. A computer-assisted diagnosis system for assisting diagnosis of abnormalities in a digital medical image, comprising:

a memory unit;

a plurality of enhancement filters stored in said memory unit, each of the plurality of filters being pre-optimized for a specific type of abnormality and adaptable for further optimization based on diagnostic parameters of a selected region in the digital medical image;

a processor operatively coupled to said memory unit for performing calculations with respect to the diagnostic parameters of the selected region and diagnostic parameters associated with a plurality of abnormalities likely to be found in the selected region to automatically identify and adapt at least one of the plurality of enhancement filters for displaying the selected region; and a display device operatively coupled to said processor for displaying at least one enhanced view of the selected region, the at least one enhanced view corresponding to the at least one of the plurality of enhancement filters being applied to the selected region.

18. The computer-assisted diagnosis system according to claim 17, further comprising a selecting device for selecting the region in the digital medical image.

19. The computer-assisted diagnosis system according to claim 18, wherein said selecting device comprises at least one of a mouse and an eye tracking device.

20. The computer-assisted diagnosis system according to claim 17, further comprising a digitizer operatively coupled to said processor for digitizing a developed x-ray mammogram.

21. The computer-assisted diagnosis system according to claim 17, wherein said display device further displays one of all and a portion of an unaltered view of the digital medical image.

22. The computer-assisted diagnosis system according to claim 17, wherein said display device further displays at least one generically enhanced view of the digital medical image.

23. The computer-assisted diagnosis system according to claim 22, wherein the at least one generically enhanced view corresponds to one of magnification, contrast-equalization, pixel inversion, edge sharpening, and edge smoothing being applied to one of all and a portion of the digital medical image.

24. The computer-assisted diagnosis system according to claim 17, wherein the display device displays various views of one of all and part of the digital medical image using a graphical user interface.

25. The computer-assisted diagnosis system according to claim 24, wherein the graphical user interface comprises a selector for selecting at least one of the various views for display.

26. The computer-assisted diagnosis system according to claim 24, wherein the various views comprise the at least one enhanced view, an unaltered view of the digital medical image, and at least one generically enhanced view of the digital medical image.

27. The computer-assisted diagnosis system according to claim 24, wherein the graphical user interface comprises a first display area for displaying the at least one enhanced view.

28. The computer-assisted diagnosis system according to claim 27, wherein the graphical user interface further comprises a second display area for displaying one of all and part of at least an unaltered view of the digital medical image.

29. The computer-assisted diagnosis system according to claim 24, wherein said graphical user interface further comprises a diagnostic parameters display box for displaying diagnostic parameters.

30. The computer-assisted diagnosis system according to claim 29, wherein the diagnostic parameters displayed in the diagnostic parameters display box comprise one of the diagnostic parameters of the selected region and diagnostic parameters corresponding to a particular abnormality.

31. The computer-assisted diagnosis system according to claim 24, wherein said graphical user interface further comprises a flicker mode actuator for switching between the at least one enhanced view of the selected region to another view of the selected region at a specified rate.

32. The computer-assisted diagnosis system according to claim 31, wherein the specified rate is defined by the user.

* * * * *